Oct. 30, 1923.

A. J. FALL

ANIMAL TRAP

Filed Feb. 19, 1923

1,472,210

Inventor
Arthur Jameson Fall

By Geo. C. Kennedy
Attorney

Patented Oct. 30, 1923.

1,472,210

UNITED STATES PATENT OFFICE.

ARTHUR JAMESON FALL, OF IOWA FALLS, IOWA.

ANIMAL TRAP.

Application filed February 19, 1923. Serial No. 619,984.

*To all whom it may concern:*

Be it known that I, ARTHUR JAMESON FALL, a citizen of the United States of America, and a resident of Iowa Falls, Hardin County, Iowa, have invented certain new and useful Improvements in Animal Traps, of which the following is a specification.

My invention relates to improvements in animal traps, and the object of my improvement is to supply a very simple, inexpensive, and effective trap for catching small vermin such as mice and rats.

Figure 1:
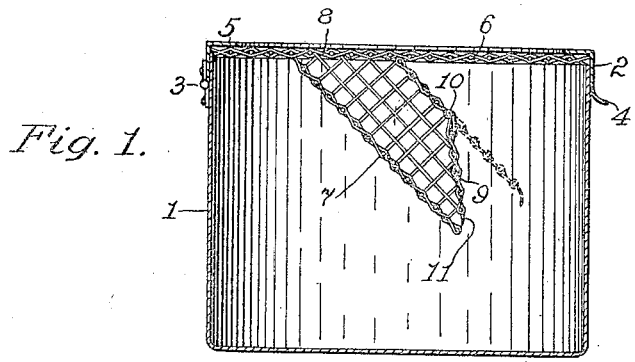
Figure 2:
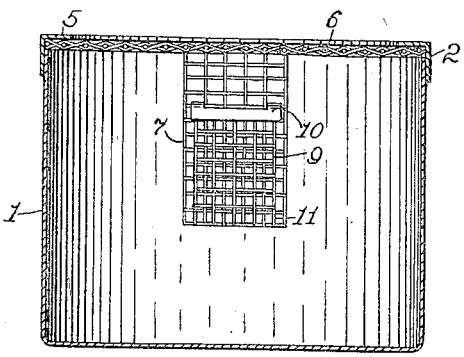
Figure 3:
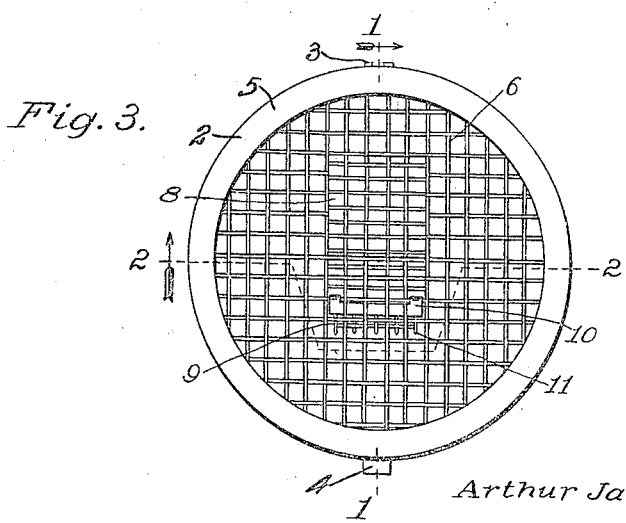

I have accomplished this object by the means which are hereinafter described and claimed, and which are illustrated in the accompanying drawings, in which Fig. 1 is a vertical cross section of the trap taken on the broken line 1—1 of Fig. 3, and Fig. 2 is another cross section thereof taken on the broken line 2—2 of said Fig. 3. Fig. 3 is a top plan view of the device.

This device comprises an open top imperforate metal receptacle which may be of any shape but is shown as a cylindrical cup or chamber with a downwardly rimmed top closure 2 preferably hinged thereto at 3 and having at the opposite side an outwardly projecting finger-piece 4 for convenience in lifting the closure. While the closure 2 may be made from a single piece of metal imperforate except for the inlet-port or opening at 8, I prefer to make the closure annular as shown at 5, inserting and fastening thereunder a top of wire netting 6, the latter having said opening 8 as shown in Fig. 3.

The numeral 7 denotes an inclined chute or runway which extends inwardly from the opening 8 of the reticulated top cover 6 with open inner end which end is preferably beveled or sloped at a different angle to the cover. A swinging gate 9 is provided for said open inner end of the chute, made likewise of wire netting and having at its upper end and fastened thereto as by soldering a cross-plate or hinge-member 10 which is hinged on a terminal cross wire of the top part of the chute, so that the gate depends and has its lower end closed against the terminus of the lower part of the chute by gravity. Longitudinal wires of said gate 9 are allowed to project and may be sharpened or pointed as at 11, the points resting in contact with said lower part of said chute.

After some bait, such as cheese or any odoriferous substance which is attractive to mice or rats has been placed in the chamber 1, and the closure 2 closed, the trap may be placed in any infested locality. The odor attracts the animals who jump upon the reticulated top where they can see the cheese or other bait, and are thereby induced to descend the sloping chute 7 pushing up the light gate 9 to enter the chamber 1, the gate falling back to its closed position. The animals cannot escape by endeavoring to push up the gate to move upwardly beneath it through the chute, as the pointed projections catch and penetrate them. The same thing occurs when an animal attempts to back out after passing partly under and lifting the gate.

Animals so trapped may be exterminated easily by filling the imperforate chamber part 1 with water, and then the top cover may be swung upwardly to eject the remains. As the device is all metal, it may be cleansed, disinfected or deodorized readily by the use of boiling water or otherwise.

The device may be constructed of any size desired, and may be of any material which cannot be destroyed by the animals, and any slight modifications in its parts or arrangement are covered by my invention.

Having described my invention, what I claim as new, and desire to secure by Letters Patent, is:

1. A hollow imperforate chamber having in its top an opening with a hollow tubular reticulated chute depending inwardly slopingly therefrom, and a gate supported swingingly within the chamber to swing yieldingly by gravity to close the inner end of the chute, said gate having terminal prongs.

2. A hollow imperforate chamber having a hinged and reticulated top, the latter having an opening, and a reticulated tubular chute runway leading slopingly from said opening into the chamber, a terminally pronged gate being hinged to the inner end of the chute to normally hang closed by gravity.

3. An open top hollow chamber, a closure swingingly mounted thereon having an opening, an inclined reticulated runway of tubular shape leading from said opening into said chamber and terminating above the floor of the chamber, and a reticulated gate mounted movably across the open inner end of the runway to close by gravity and to open yieldingly by a push from within the runway, said gate having at its lower end pointed projections directed toward and closing terminally against the runway.

Signed at Waterloo, Iowa, this 16th day of Jan., 1923.

ARTHUR JAMESON FALL.